March 12, 1929. G. H. NORQUIST ET AL 1,705,132
WINDOW SCREEN
Filed March 14, 1927 3 Sheets-Sheet 1
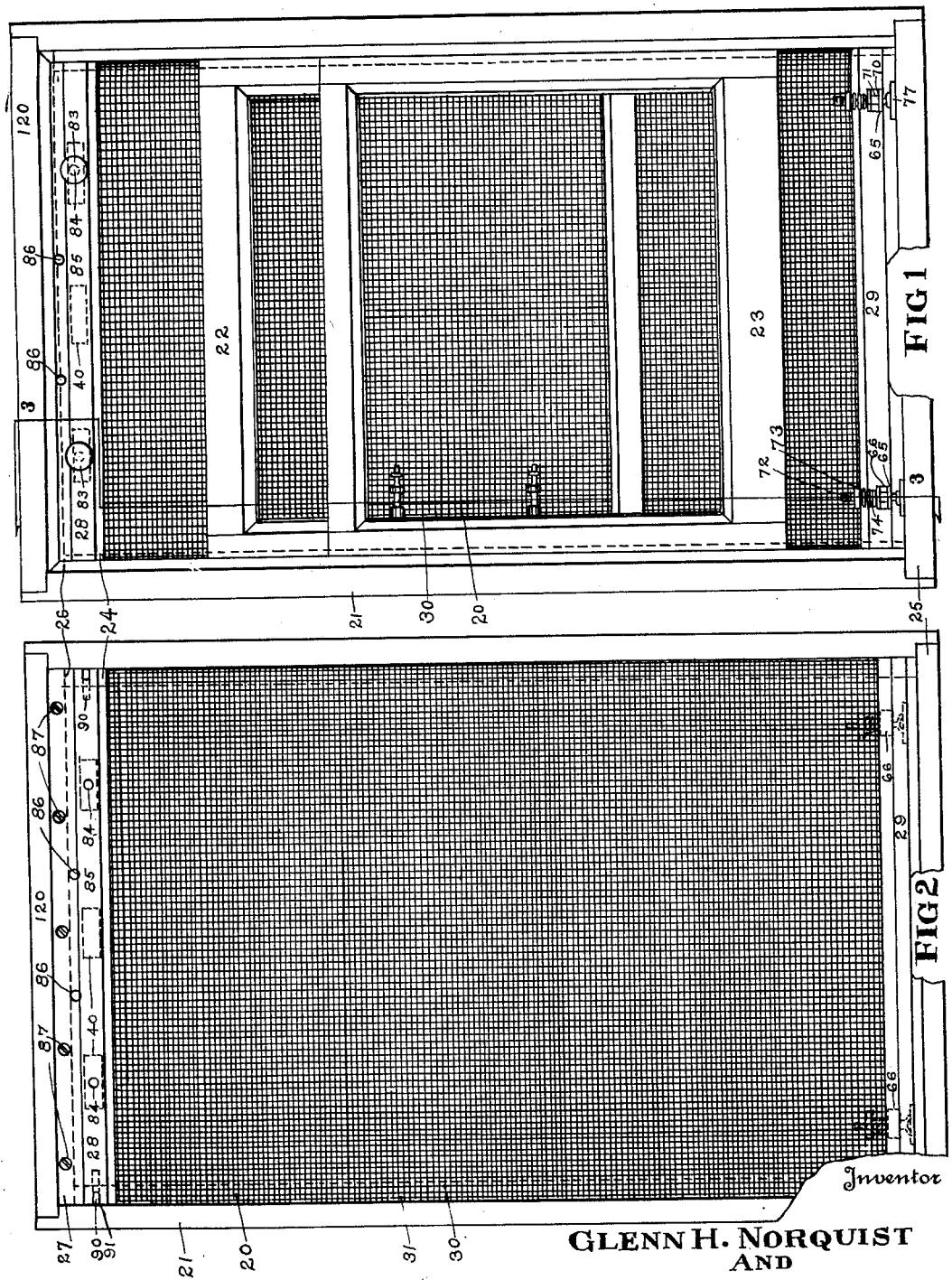
Inventor
GLENN H. NORQUIST
AND
RALPH A. NORQUIST
By Clarence S Walker
Their Attorney March 12, 1929.  G. H. NORQUIST ET AL  1,705,132
WINDOW SCREEN
Filed March 14, 1927   3 Sheets-Sheet 2
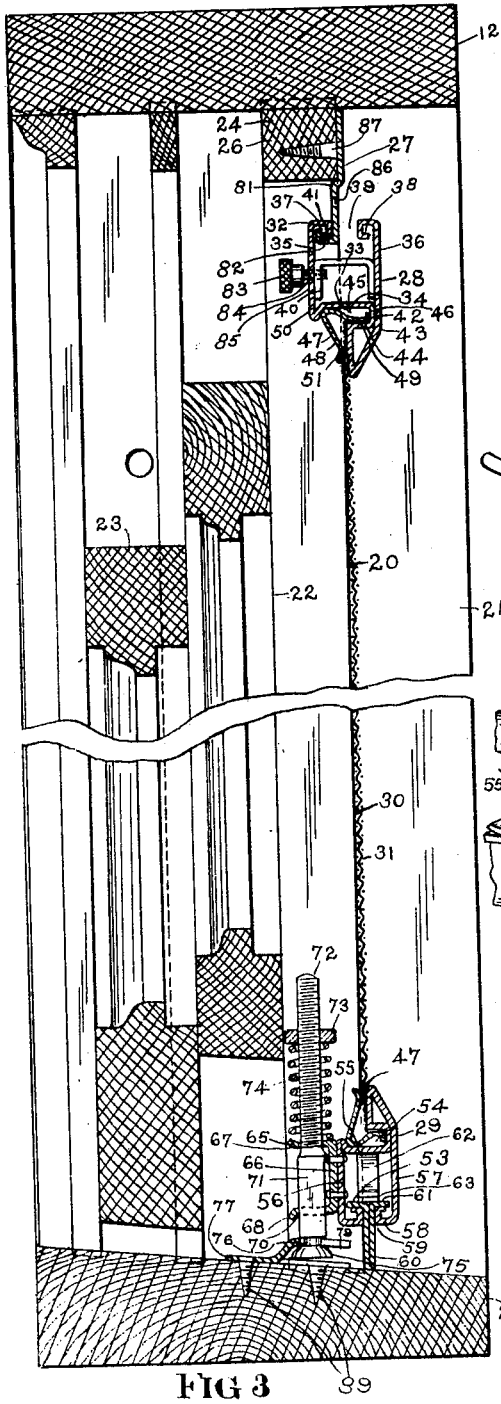
FIG 3
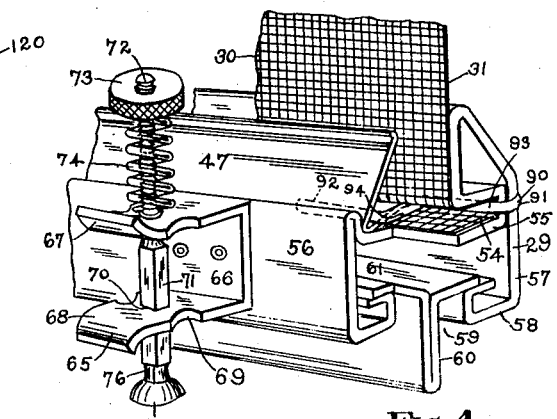
FIG 4
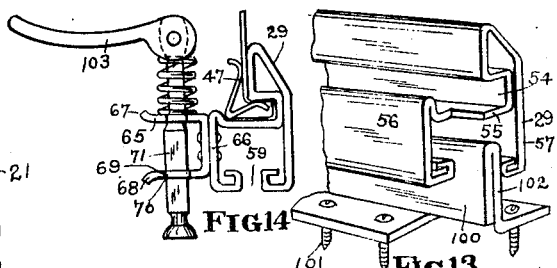
FIG 14  FIG 13
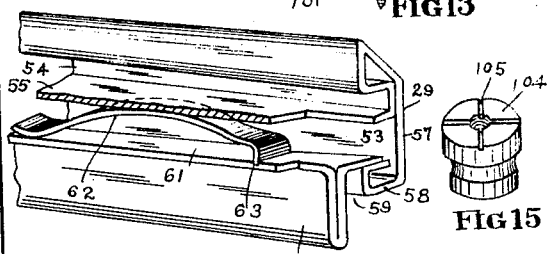
FIG 5  FIG 15
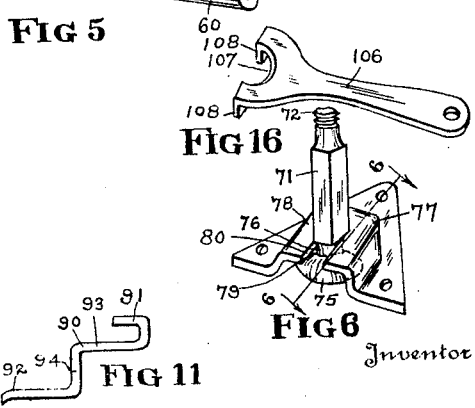
FIG 16
FIG 6
FIG 11
Inventor
GLENN H. NORQUIST
AND
RALPH A. NORQUIST
By Clarence S. Walker
Their Attorney March 12, 1929. G. H. NORQUIST ET AL 1,705,132
WINDOW SCREEN
Filed March 14, 1927 3 Sheets-Sheet 3
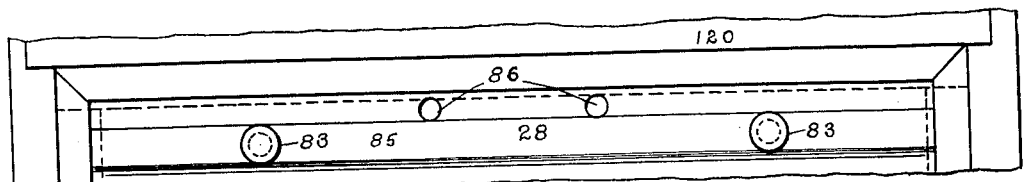
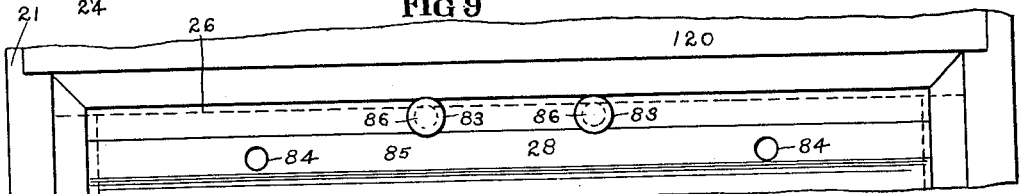
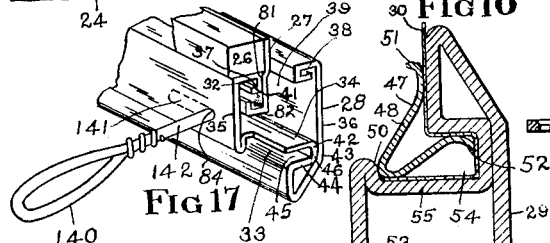
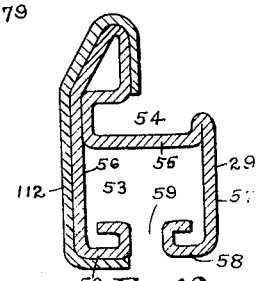
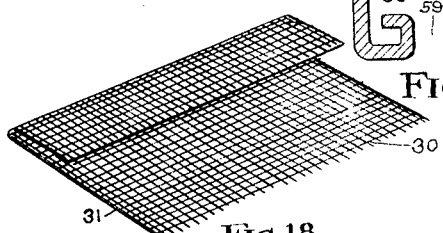
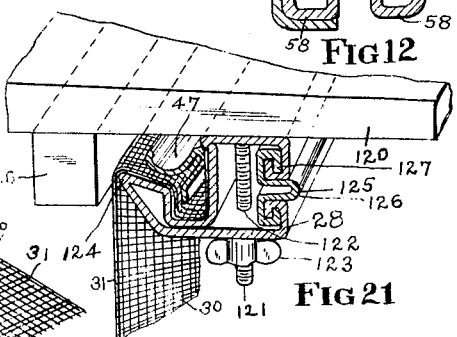
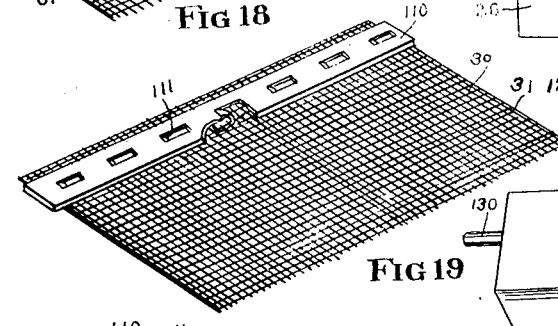
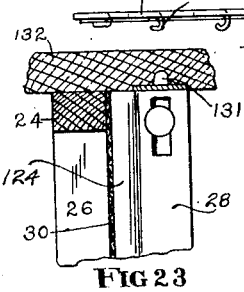
Inventor
GLENN H. NORQUIST
AND
RALPH A. NORQUIST
By Clarence S. Walker
Their Attorney Patented Mar. 12, 1929.

1,705,132

UNITED STATES PATENT OFFICE.

GLENN H. NORQUIST AND RALPH A. NORQUIST, OF JAMESTOWN, NEW YORK.

WINDOW SCREEN.

Application filed March 14, 1927. Serial No. 175,134.

This invention relates to an improvement in a window screen and more particularly to the construction of the screen and the means for mounting it upon the window frame.

One object of this invention is to provide a screen having upper and lower cross bars only which can be mounted in the window frame with the side edges of the screen in contact with the blind stops.

Another object of this invention is to provide in such a screen means for removably fixing the upper cross bar at the top of the window frame and for removably and yieldably fixing the lower cross bar to the sill of the window thereby placing the body portion of the screen under tension.

A further object of this invention resides in the construction of the screen bars and in the means for firmly but removably securing the edges of the screen body portion to said bars.

Other objects reside in the details of construction and will appear from an examination of the following specification taken in connection with the drawings which form a part thereof, and in which Fig. 1 is a front elevation of a window frame equipped with a screen embodying one form of this invention;

Fig. 2 is a rear elevation of the installation shown in Figure 1;

Fig. 3 is a transverse sectional view taken along the line 3—3 of Figure 1;

Fig. 4 is an enlarged perspective view of one end of the lower cross bar of the screen;

Fig. 5 is an enlarged perspective view of a portion of the lower cross bar, parts being broken away;

Fig. 6 is an enlarged perspective view of the latch and anchor pin;

Fig. 7 is a sectional view taken along the line 6—6 of Figure 6;

Fig. 8 is an enlarged sectional view showing the joinder of screw cloth and cross bar;

Fig. 9 is an enlarged inside view of the upper part of window frame and screen illustrating the knobs in position for moving the cross bar;

Fig. 10 is a view similar to Figure 9, illustrating the knobs in position for locking the cross bar against involuntary removal;

Fig. 11 illustrates a clip for securing the edge of the cloth in a cross bar;

Fig. 12 is an end view of the lower cross bar showing the reinforcing strap in position;

Fig. 13 is a perspective view illustrating an alternate form of sealing strip;

Fig. 14 illustrates another means for securing the locking pins in place;

Fig. 15 illustrates still another means for securing the locking pins in place;

Fig. 16 illustrates a tool for operating the means shown in Figure 15;

Fig. 17 is a perspective view of a portion of the upper cross bar and of a tool by which the upper cross bar can be moved;

Fig. 18 illustrates the edge of the screen cloth folded;

Fig. 19 illustrates the edge of the screen cloth provided with a reinforcing strip;

Fig. 20 is a side elevation of the strip shown in Figure 19;

Fig. 21 is a perspective sectional view illustrating an alternate manner for fixing the upper cross bar in the window frame;

Fig. 22 is a similar view of another manner for fixing the upper cross bar in the window frame; and Fig. 23 is a sectional bottom plan view thereof.

In the drawings, a screen 20 embodying this invention is shown installed in a window frame 21, within which are mounted upper and lower sashes 22, 23 in the usual manner. The window frame 21 includes side blind stops 24, arranged at each side of the window in the usual manner, a sill 25 and a blind stop head 26. Fixed to the outer face of the head 26 is a cross strip 27 from which it will be pointed out below, the screen 20 is suspended. The screen is clamped to the sill 25 with its edges bearing against the outer faces of the stops 24, thus sealing the window opening against the entry of insects.

The screen 20 comprises generally an upper cross bar 28, a lower cross bar 29 and a body portion 30, ordinarily of wire cloth, and so referred to for purposes of convenience only, but not limited thereby. The cloth 30 is rigidly secured to the cross bars 28 and 29, and when in final position, its edges 31 bear against the blind stops 24.

The cross bar 28 is preferably made of sheet metal bent to provide pockets 32 and 33 separated by a partition 34. The pocket 32 includes inner and outer walls 35, 36, which terminate in flanges 37, 38, separated from each other to provide a passage 39, through which entry to the pocket 32 is provided. For the purpose of stiffening the walls 35, 36 of the pocket 32, a plurality of straps 40 are provided, preferably channular in form, and installed as shown in Figure 3, with the legs extending downwardly against the inner faces of the walls. The flange 37 is bent downwardly parallel to and spaced from the wall 35, thus providing a recess 41 for a purpose to be described later. The flange 38 is preferably bent into the form of a rectangle in order to stiffen the upper edge of the outer wall 36.

The pocket 33 is defined by an inner wall 42 and an outer wall 43, both of which are of double thickness, and a shelf 44 parallel to the plate 34. Between the shelf 44 and the inner wall 42 is provided an opening 45 leading into the pocket 33. Projecting from the shelf 44 at right angles thereto extends a surface 46.

The pocket 33 receives the upper edge of the cloth 30, which bears against the surface 46, the shelf 44 and the inner face of the wall 43. The cloth is held within the pocket by means of a securing plate 47 consisting of arms 48, 49 at an acute angle to each other, and meeting at a corner 50. The outer edge of the arm 48 is bent outwardly at 51 and the outer edge of the arm 49 is similarly bent outwardly at 52. The securing plate 47 is snapped into the pocket 33 with the corner 50 resting in the angle formed by the wall 42 and the partition 34. The edge 51 of the arm 48 clamps the cloth against the surface 46, while the edge 52 of the arm 49 clamps the cloth against the shelf 44. Thus the upper edge of the cloth is rigidly secured in the pocket 33, while the angle plate 47 has three points of contact with the crossbar 28.

The cross bar 29 is similar to the cross bar 28 in many respects, and is also provided with a pair of pockets 53, 54, separated by a partition 55. The lower edge of the cloth 30 is clamped in the pocket 54 by a second securing plate 47. The pocket 53 includes an inner wall 56 and an outer wall 57, each of which walls terminates at its lower edge in a flange 58 which is bent inwardly, upwardly and outwardly to define an opening 59. Carried within the pocket 53 and projecting through the passage 59 is a sealing strip 60, provided at its upper edge with a pair of outwardly extending flanges 61. The strip 60 here shown as of metal may also be of felt or rubber, and is normally held with the flanges 61 resting upon the flanges 58 by means of a spring 62. One end of the spring 62 enters a notch 63 provided in the upper surface of the flanges 61, while the other end is free to slide on the upper surface of the flanges 61. The cross bars 28 and 29 have been described and illustrated as integral, but obviously could be composed of several sections, if desired.

Rigidly secured to the outer face of the inner wall 56 are two or more brackets 65, each of which include a central body portion 66, rigidly secured to the wall 56, and upper and lower parallel ears 67, 68, at right angles to said body portion. The side edges of the ears 67, 68 are preferably provided with notches 69 for a purpose to be described later. Through the ears 67, 68 are formed holes 70 through which an anchor pin 71 is free to reciprocate. The lower end of the pin 71 is preferably made rectangular or non-circular, the hole 70 in the ear 68 being similarly formed to prevent any turning of the pin in the bracket, and the upper end 72 of the pin 71 may be threaded to receive a knurled collar 73. A coil spring 74 surrounds the pin 71 between the under face of the collar 73 and the upper face of the ear 67.

At the lower end of the pin 71 is provided a foot 75, preferably somewhat larger in diameter than the body of the pin 71, and separated therefrom by an annular groove 76. Secured on the upper surface of the sill 25 between the blind stops 24 are latches 77, the central portions 78 of which are domed to provide pockets 79 opening at the outer edge of the latch and in the dome 78 is formed a slot 80 leading from the outer edge of the plate. The foot 75 enters the pocket 79, the groove 76 passing along the slot 80 which prevents the foot 75 from leaving the pocket except by a horizontal movement. The foot 75 is held against the top of the dome 78, which is inclined downwardly at its edge so that the spring 74 must be put under tension to allow the foot to leave the pocket.

The cross strip 27 is preferably provided with a transverse shoulder 81, which engages the lower edge of the head 26, thus determining the position to be taken by the strip 27. At its lower edge the strip 27 terminates in a hook 82 which may enter the pocket 32 through the passage 39 and be seated in the recess 41 formed by the flange 37. In Figure 3 is shown fixed on the inner face of the wall 35 a plurality of knobs 83, preferably threaded into holes 84 formed through the wall 85, and the reinforcing straps 40. In the strip 27, between the shoulder 81 and the hook 82 are formed a plurality of threaded holes 86, which are adapted to receive the knobs 83 under certain conditions.

The screen thus described is mounted upon the window frame 21 in the following manner; the strip 27 is secured to the head 26 by means of screws 87, the shoulder 81 bearing against the lower edge of the stop, the portion of the strip 27 below the shoulder just filling the space between the side stops 24. The latches 77 are mounted upon the upper face of the sill 25 by means of suitable screws 89. The cross bar 28 of the screen 20 is raised by the knobs 83 into engagement with the hook 82 of the strip 27, as shown in Figure 3, and the notches 69 of the brackets 65 are then grasped to draw the lower cross bar 29 toward the sill 25. The pins 71 are introduced into the pockets 79 in the latches 77 to hold the cross bar 29 in that position. The springs 74 on the pins 71 bearing upon the brackets 65 tend to draw the crossbar 29 downwardly, and bring the edges 31 of the cloth 30 firmly against the outer faces of the blind stops 24. In order to provide sufficient tension to force the cross bar 29 downwardly into the proper position and make the cloth 30 taut the collars 73 are turned down as far as necessary. The strip 60 bears against the upper face of the sill 25 and is adjustably held in that position by the springs 62, thus sealing the space between the lower cross bar 29 and the sill.

The cross bars 28 and 29 are longer than the space between the stops 24 and hence in order for the edges 31 of the cloth 30 to bear against the outer faces of the stops 24 the inner surfaces of the cross bars at each end must of necessity be cut away. The securing plates 47, however, are made only long enough to extend between the stops 24, and consequently the outer edges 31 of the cloth 30 are not clamped by the plates 47. In order to secure these edges in place, wire clips 90 are provided which are preferably Z-shaped in cross section, as shown in Figure 11 terminating at one end in a hook 91, and at the other end in an upturned tip 92. The clips 90 are inserted into the ends of the pockets 33 and 54, the hooks 91 passing around the ends of the crossbars to secure them in place. The length 93 functions like the edge 52 of the plate 47 to clamp the cloth against the outer wall of the pocket, while the length 94 of the clip is of such dimension that the tip 92 will enter the corner 50 of the strip 47, thus holding the length 93 in its place and insuring a securement of the edge of the cloth in the crossbar. The sealing strip 60 is, as shown in the drawings, in alignment with the cloth 30 and its ends rest against the outer faces of the stops 24. The ends of the inner flange 61 must accordingly be notched as shown in Figures 4 and 5.

In place of the sealing strip 60 carried in the cross bar 29, other means may be provided, if desired, to seal the space between the lower cross bar 29 and the sill 25. Thus as shown in Figure 13, a strip 100 may be secured to the upper face of the sill by means of screws 101. This strip 100 includes a vertically extending tongue 102, which enters the pocket 53 through the passage 59. The springs 62 are in this construction omitted and the springs 74 are relied upon to hold the crossbar 29 over the tongue 102. The objection to this construction is that either the strip 100 must be left on the sill at all times, or it must be removed after the screen season is over, and for that reason the use of the strip 60, which is incorporated in the screen is preferred.

Locking cams 103 (see Figure 14) may be substituted for the collars 73 on the pins 71, being pivotally mounted upon the ends of the pins and functioning as do the collars 73 to tighten the spring 74 and yieldingly to hold the cloth 30 taut. Another means for increasing the tension of the springs 74 may be the nuts 104 (see Figure 15), which are not knurled, but provided with a plurality of cross slots 105 adapted to be engaged by a tool 106, which includes a yoke 107 terminating in flanges 108 (see Figure 16). A construction of this latter type is particularly desirable in hotels where the screens are to be firmly secured, so that they cannot easily be removed by the occupants.

When it is desired to open the screens to allow washing of the windows or for any other reason the collars 73 are first loosened to permit the release of the anchor pins 21 from the latches 77. This can quickly and easily be done and the screens 20 swung outwardly supported on the strip 27. The screen may be locked, so that it cannot be released involuntarily from the strip 27, by inserting one or more of the knobs 83 in the holes 86, thus preventing the raising of the bar 28 relative to the strip 27.

If the screen is to be fully removed from the window the knobs 83 are taken from the holes 86 and replaced in the holes 84 and the upper cross bar 28 raised by means of the knobs 83 until the hook 82 leaves the pocket 41. The cross bar is swung inwardly enough to bring the hook 82 in line with the opening 39, and then lowered to free it from the strip 27, thus completely removing the screen from the window. The cross piece 27 is inconspicuously placed on the blind stop head 26, and under ordinary circumstances need not be removed. The latches 77 can also be left upon the window, but if preferred they can easily be detached therefrom.

While the screens are made up for various standard widths of windows it sometimes happens that the window on which the screen is to be installed is a trifle narrower than the standard type. Under such circumstances portions of the cross bars 28, 29 can be removed from one end, thus allowing them to assume their usual position. The edge 31 of the cloth, however, is preferably a selvage, and it is not desirable or advantageous to cut this off. Instead of doing so, therefore, the edge of the cloth can be folded over, as shown in Figure 18.

The edges 31 of the cloth 30 may, if desired, be stiffened by the use of metal strips 110. These strips 110 are preferably provided with a plurality of integral hooks or tongues 111, which pass through the interstices of the cloth and can be bent back in order to fix the strip 110 in place.

The wall 57 of the lower bar 29 may under certain conditions need reinforcement, and in such case a plurality of straps 112 may be provided. The straps are bent around the outer face of the cross bar 29, extending from the lower face of the flange 58, and terminating within the pocket 54. (See Figure 12.) These straps 112 when at the ends of the cross bar 29 do not interfere with the function of the securing plate 47, and since they project between the edges 31 of the cloth and the cross bar 29 above the pocket 54, bring the lower ends of the edges against the stops 24 before the rest engage, thus insuring a close contact between the stops and edges of the cloth.

The screen 20 may be secured directly to the head of the window as shown in Figures 21, 22 and 23 instead of being suspended from the strip 27. Thus the crossbar 28 may be secured to the window head 120, by means of bolts 121, which project down from the head and pass through holes 122 in the cross bar and nuts 123. The tip 124 of the bar 28 will rest against the outer face of the blind stop head 26, so that the cloth 30 will bear against the head 26 and the side stops 24. The number and location of the bolts 121 can be varied as desired and the holes 122 in the cross bar 28 be determined to correspond thereto. The passage 39 to the pocket 32 in the cross bar 28 may be closed by a strip 125 having a central portion 126, which fills said passage 39, and flanges 127 which interlock with the flanges 37, 38.

The cross bar 28 may also be secured to the window head 120 by means of end bolts 130, which will enter sockets 131 formed in the sides 132 of the window frame. As in the form of fastening just described the bar 28 rests against the head of the window with the tip 124 against the outer face of the blind stop head 26, so that the cloth 30 will bear against the side blind stops 24. The passage 39 into the pocket 32 of the cross bar is closed by means of the strip 125 in this construction also.

Under certain conditions it may be found advisable to omit the knobs 83 in the holes 84. Then in order to remove the screen 20 from the strip 27 a tool 140 may be employed having a tip 141 at right angles to the shaft 142. Two such tools are generally used, the tips 141 being inserted into the holes 84 so that the operator can move the cross bar 28 in any desired direction in order to disengage it from the strip 27.

While certain embodiments of this invention have been shown and described, applicants are not limited thereto, since it is obvious that other embodiments can be made without departing from the spirit and scope of this invention as set forth in the following claims.

Having thus set forth our invention what we claim as new and for which we desire protection by Letters Patent is:

1. A screen adapted to be mounted upon a window frame having blind stops said screen having upper and lower cross bars and a body portion fixed to said bars, means for securing said upper cross bar to said frame with the upper side edges of said body portion against said blind stops and means for securing said lower cross bar to said frame said last named means including latches fixed upon said frame and pins carried by said lower cross bar and adapted to engage said latches.

2. A screen adapted to be mounted upon a window frame having side and head blind stops and a sill, said screen including an upper cross bar, a lower cross bar and a body portion carried by said cross bars, means for securing said upper cross bar to said frame with the side edges of said body portion resting against the outer faces of said side blind stops, means for removably securing said lower cross bar to said sill, and means for sealing the space between said lower cross bar and said sill.

3. A screen adapted to be mounted upon a window frame having side and head blind stops and a sill, said screen including an upper cross bar, a lower cross bar and a body portion carried by said cross bars, means for securing said upper cross bar to said frame with the side edges of said body portion resting against the outer faces of said side blind stops, means for removably securing said lower cross bar to said sill, and means for yieldably sealing the space between said lower cross bar and said sill.

4. A screen adapted to be mounted upon a window frame having side and head blind stops and a sill, said screen including an upper cross bar, a lower cross bar and a body portion carried by said cross bars, means for securing said upper cross bar to said frame with the side edges of said body portion resting against the outer faces of said side blind stops, means for removably securing said lower cross bar to said sill, and means carried by said lower cross bar and bearing upon said sill for sealing the space between said bar and said sill.

5. The combination of a window frame having side and head blind stops and a sill, of a strip carried by and depending from said head blind stop between said side blind stops, a screen including an upper cross bar, a lower cross bar and a body portion carried by said cross bars, said strip terminating in a hook and said upper bar having a pocket to which entry is provided from the top of said bar, said screen being supported upon the hook of said strip which enters said pocket, latches on said sill between said side blind strips, pins carried by said lower cross bar which engage said latches and means for increasing the tension of said body portion to hold the side edges thereof against said side blind stops.

6. The combination of a window frame having side and head blind stops and a sill, of a strip carried by and depending from said head blind stop between said side blind stops, a screen including an upper cross bar, a lower cross bar and a body portion carried by said cross bars, said strip terminating in a hook and said upper cross bar having a pocket to which entry is provided from the top of said bar, said screen being supported upon the hook of said strip which enters said pocket, latches on said sill between said side blind strips, pins carried by said lower cross bar which engage said latches and means carried by said pins for increasing the tension of said body portion to hold the side edges thereof against said side blind stops.

7. In a window screen a cross bar having a pocket therein adapted to receive one edge of the body portion of said screen, said pocket having a base, inner and outer walls and a shelf parallel to and spaced from said base and means for securing the edge of said body portion in said pocket.

8. In a window screen a cross bar having a pocket therein adapted to receive one edge of the body portion of said screen, said pocket having a base, inner and outer walls and a shelf parallel to and spaced from said base and means for securing the edge of said body portion in said pocket which means comprises an angle plate engaging said shelf and one of said walls.

9. In a window screen a cross bar having a pocket therein adapted to receive one edge of the body portion of said screen, said pocket having a base, inner and outer walls and a shelf parallel to and spaced from said base and means for securing the edge of said body portion in said pocket which means comprises an angle plate, one arm of said plate engaging said shelf and the corner thereof engaging one of said walls.

In testimony whereof we have affixed our signatures.

GLENN H. NORQUIST.
RALPH A. NORQUIST.